United States Patent
Harple et al.

(10) Patent No.: US 6,195,091 B1
(45) Date of Patent: *Feb. 27, 2001

(54) APPARATUS FOR COLLABORATIVE COMPUTING

(75) Inventors: Daniel L. Harple, Dillsburg; Richard H. Pizzarro, Mechanicsburg, both of PA (US)

(73) Assignee: Netscape Communications Corporation, Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,361

(22) Filed: Dec. 10, 1997

Related U.S. Application Data

(63) Continuation of application No. 08/401,922, filed on Mar. 9, 1995, now Pat. No. 5,724,508.

(51) Int. Cl.⁷ ........................................ G06F 3/00
(52) U.S. Cl. .................. 345/330; 345/329; 345/331; 709/204; 709/205
(58) Field of Search ............... 345/329–35, 971; 395/200.31, 200.33, 200.34, 200.35; 709/201, 203–205

(56) References Cited

U.S. PATENT DOCUMENTS

| | | | |
|---|---|---|---|
| 5,014,267 | * 5/1991 | Tompkins et al. | 370/259 |
| 5,133,053 | 7/1992 | Johnson et al. | 395/200 |
| 5,423,038 | * 6/1995 | Davis | 395/683 |
| 5,471,318 | 11/1995 | Ahuja et al. | 358/400 |
| 5,491,797 | * 2/1996 | Thompson et al. | 709/204 |
| 5,557,725 | 9/1996 | Ansberry et al. | 395/153 |
| 5,617,539 | 4/1997 | Ludwig et al. | 395/200 |
| 5,664,126 | * 9/1997 | Hirakawa et al. | 345/329 |
| 5,694,549 | * 12/1997 | Carlin et al. | 395/200.8 |
| 5,729,687 | * 3/1998 | Rothrock et al. | 709/204 |
| 5,886,707 | * 3/1999 | Berg | 345/329 X |

OTHER PUBLICATIONS

B. Aldred et al, "Call Management in a LAKES Environment," 5th IEEE COMSOC Workshop—MULTIMEDIA '94, Kyoto, Japan, May 16–19, 1994, pp. 4/4/1–6.

S. Phipps, "No Tardis Required: Productivity through cooperative networking from the desktop," IBM UK Laboratories Ltd., 1994, pp. 1–16.

* cited by examiner

*Primary Examiner*—Raymond J. Bayerl
*Assistant Examiner*—X. L. Bautista
(74) *Attorney, Agent, or Firm*—Michael A. Glenn; Kirk Wong

(57) ABSTRACT

A collaborative computing system that permits the use of network and platform independent applications, and is easily customized. A conference engine provides a network interface between applications and the network, so that applications can be written independent of the network or platform. The conference engine provides both networking and conference management functions. The applications are organized into application modules, each of which provides a discrete collaborative computing function. The application modules use a library of collaboration commands to provide collaborative computing functions to the conference engine, and connect to the conference engine via inter process control mechanisms. The application modules can, in turn, be customized by user interface modules, which customize the user interface of the application modules and permit application module-independent user interfaces.

16 Claims, 5 Drawing Sheets

APPARATUS FOR COLLABORATIVE COMPUTING

This is a continuation of U.S. Ser. No. 08/401,922, filed Mar. 9, 1995 now Pat. No. 5,724,508.

FIELD OF THE INVENTION

This invention relates to the field of collaborative computing and, more particularly, to collaborative computing apparatus operable across multiple platforms.

BACKGROUND OF THE INVENTION

The ability for computer users to share work and otherwise to communicate, through desktop collaboration (including conferencing), is becoming increasingly important in business, government, and research environments. However, while networks of multimedia-enabled desktop workstations and personal computers are becoming the norm, numerous operating systems, network technologies, and communications services continue to exist. The ability to collaborate effectively is severely hampered by the lack of a single standard.

Different users also have vastly different desktop collaboration needs, depending largely on the setting. Computer users may be involved in staff meetings, project meetings, formal presentations, medical consultations, military or intelligence briefings, depositions, or other settings with very different requirements. The same users may be involved in different settings at different times. These settings and the collaborative requirements of these settings are not always adequately replicated by existing desktop collaboration environments, which typically take the form of either a virtual conference room (for example, Communique!, by InSoft, Inc. of Mechanicsburg, Pa.) or an extension of the telephone paradigm (the traditional video teleconferencing environment). While these existing forms permit desktop collaboration, they do not permit the customization of the collaboration environment to most effectively meet the needs of the various settings in which collaboration takes place.

For example, some settings require access to shared workspace to be controlled by a moderator (e.g., during a formal presentation), but other settings require relatively little control (e.g., during a design team meeting). Also, in some settings, allocation of screen space to different functions may need to be fixed to ensure that all necessary data, images, and other information is available to all participants in the same form. However, in other settings it is appropriate to permit participants to adjust the allocation of screen space for their own requirements. Different needs for control over conference participation may also exist. In military and intelligence settings, for example, tight control must be placed over who can participate in and monitor a conference. However, for a general staff briefing it may be appropriate to allow a broad range of access and there may be few control requirements.

Effective desktop collaboration also requires the ability to customize the tools shared by the users. For example, design teams may need to share computer-aided design (CAD) tools, engineers may need to share computeraided engineering (CAE) tools, attorneys may need to share document creation and review tools, and physicians may need tools to examine high-quality images. However, many collaborative environments will not require all of these functions. While certain basic functions (such as audio and video connections or a whiteboard) may usually be needed, users need to be able to select and revise the functions they will use. Some users may want to incorporate custom applications for their particular needs. Therefore, a desktop collaboration system should permit the integration of various off-the-shelf and custom applications to meet a customer's needs. Also, a desktop collaboration system should permit applications to be written independent of the intricacies of the specific platform and network techniques being used. However, existing desktop collaboration systems do not permit easy customization of applications.

It is therefore an object of the present invention to provide an improved collaborative computing system that can operate across multiple computer platforms and network technologies.

It is another object of the present invention to provide an improved collaborative computing system that permits customization of features and applications.

SUMMARY OF THE INVENTION

According to the present invention, these and other objects and advantages are achieved by employing a system that uses platform and subsystem independent modules and an open architecture that permits the creation and use of collaborative computing applications independent of the hardware and software platforms on which the collaboration will take place.

The system includes a virtual network module, or conference engine, which serves as an interface between collaborative computing applications and the network. The conference engine presents the same interface for collaborative computing applications regardless of the computer platform and network technology with which the collaborative application is used. The conference engine provides for tightly and loosely coupled sessions between the distributed application components, multiplexed message and data distribution, and distributed clipboarding. The conference engine also provides conference management functions.

Application modules, such as audio and video tools and a conference manager, connect to the conference engine through inter-process control (IPC) mechanisms and may connect to specialized hardware (e.g., a graphics board). The IPCs are operating system dependent. The application modules may be linked to an applications library, which provides the services required to communicate with the conference engine.

Collaborative computing applications are built around one or more of the application modules, and can include user interface modules, which control the interface between the user and application modules. An applications program interface (API) provides the services required for the user interface modules to communicate with the application modules.

DETAILED DESCRIPTION OF PREFERRED EMBODIMENTS

The present invention is for an apparatus for collaborative computing operable across multiple platforms.

Figure 1:
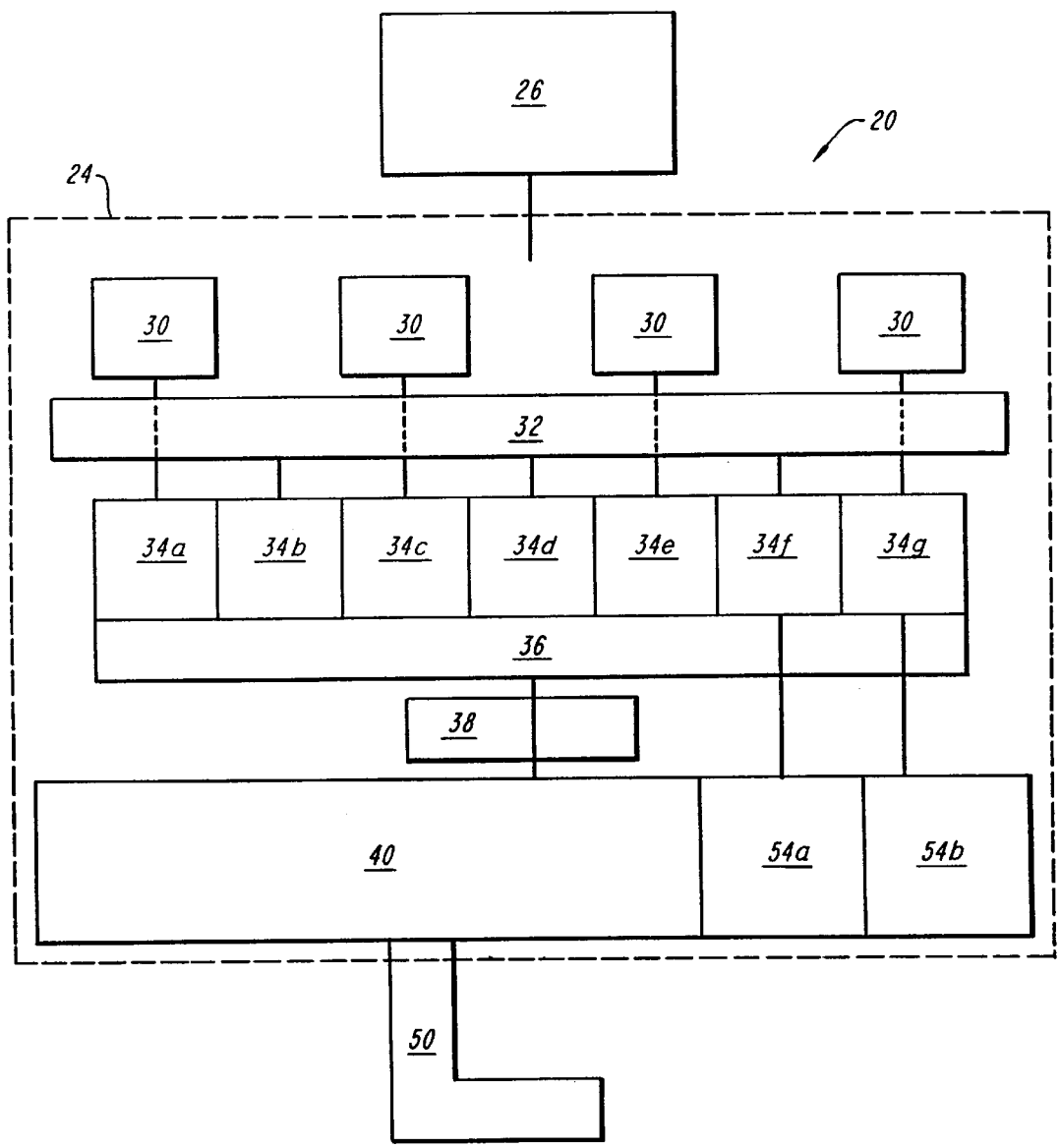
FIG. 1 is a block diagram of an embodiment of the collaborative computing system of the present invention.

Referring to FIG. 1, a collaborative computing system 20 is installed in workstation 24, and includes user interface modules 30, user interface API 32, application modules 34 (shown as 34a–34g), applications library 36, IPCs 38, and conference engine 40. Conference engine 40 connects to network 50, which can be, for example, a packet-based network (such as Ethernet), a telephony-based network (such as ISDN), or a cell network (using ATM), or asynchronous connections utilizing current modem technology.

Workstation 24 can be almost any multi-media enabled workstation operating in a Unix-based, Microsoft Windows, or similar environment.

Conference engine 40 serves as a virtual network, which provides a network-independent interface to collaborative computing applications and users, and provides conference management functions, data and message distribution, and distributed clipboarding. Conference engine 40 initiates collaborative sessions; allocates and manages memory needed for a collaborative session; provides file management functions; provides a clipboard for application modules; adds and deletes participants to a collaborative session; maintains lists of available participants; sets up, maintains, and removes application modules from a collaborative session; maintains the data structures needed for the collaborative session; provides information regarding the state of a collaborative session (e.g., who is participating and which application modules are running) to application modules; provides information to a requesting application module regarding other applications modules; and distributes data and events (changes in the collaborative session, such as the addition or deletion of a participant or an application module, or the sending of an invitation for a user to join a collaborative session) to specified application modules 34 (both over network 50 and to other application modules 34 within the same workstation 24). With conference engine 40, application modules 34 do not need to address or know the manner in which network communications are made.

Figure 5:
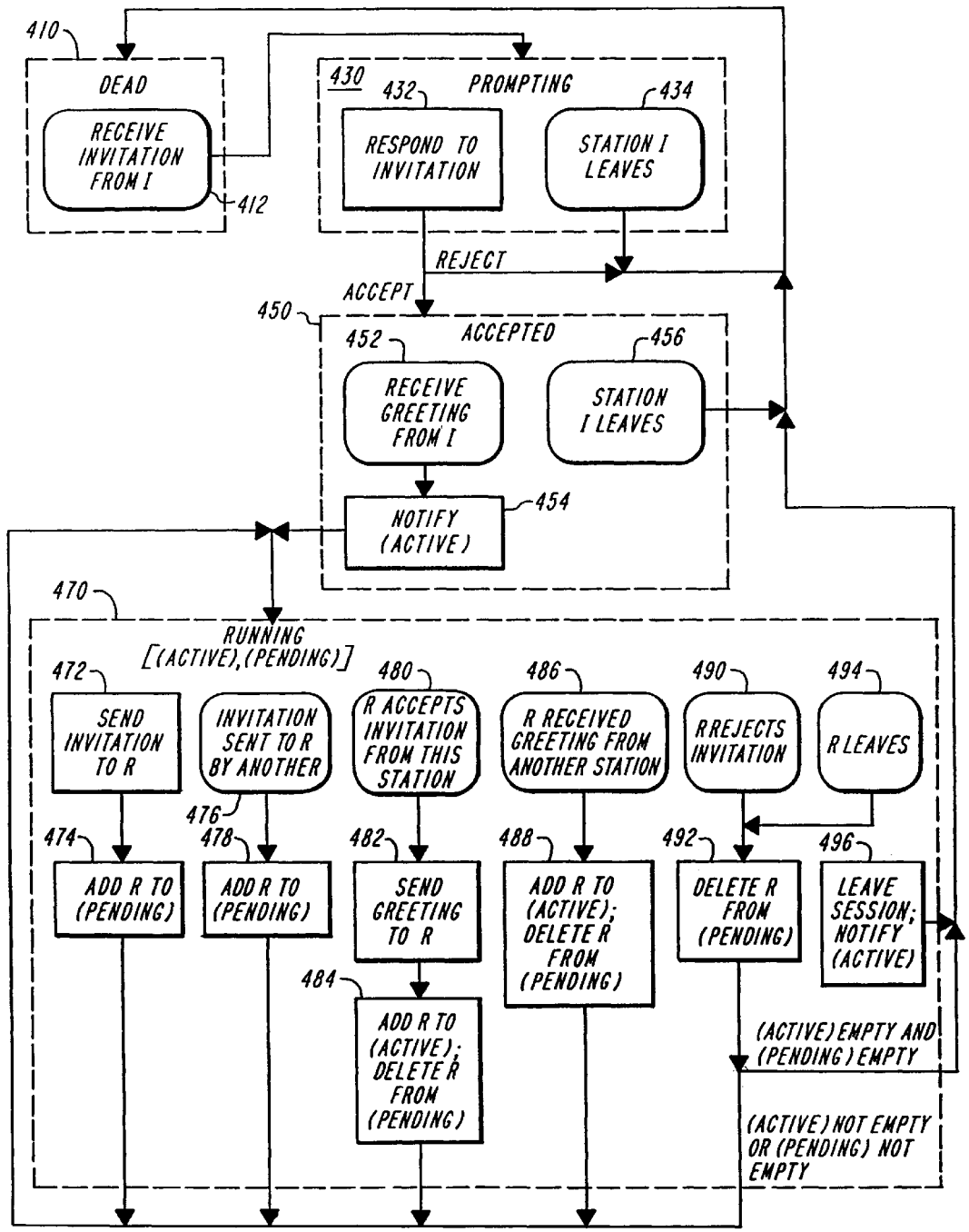
FIG. 5 is a flowchart illustrating the operation of the state machine of the collaborative computing system of the present invention.

Conference engine 40 also functions as a distributed state machine for a collaborative session, as is illustrated in FIG. 5. In a preferred embodiment, the state machine includes four states. A "dead" state 410 indicates that a conference has been terminated. A "prompting" state 430 indicates that the conference engine (and its associated workstation) has received an invitation to begin a conference but has not yet responded. An "accepted" state 450 indicates that the conference engine has accepted an invitation to begin a conference but has not yet received an initial message (a "greeting") from the user that sent the invitation. Finally, a "running" state 470 indicates that the conference is active at that station. Thus, while a collaborative session is being initiated, different conference engines will be in different states. The transitions among states are described below.

Application modules 34 provide discrete collaborative computing services. Each application module 34 (e.g., a text tool, an audio tool, or a video tool, as described in more detail below) has a distinct port number associated with it so that data from an application module in a sending workstation 24 can be properly routed to the corresponding application module in each other workstation 24.

In a preferred embodiment, one application module is a conference manager 34a, which provides an interface to the conference management functions of conference engine 40, for managing collaborations among participating workstations 24. As described above, the conference engine 40 is a distributed state machine for the conference session. Conference manager 34a controls the current collaborative state of the local user and depicts the overall state of the collaborative session.

Conference manager 34a can initiate or expand a collaborative session by sending an invitation to one or more other conference managers. If the local state is "dead", and a conference manager receives an invitation (through conference engine 40), depicted at 412 in FIG. 5, the state changes to "prompting" 430 and the conference manager receives the identity of the inviter. If the invitee is not in a "dead" state, it will reject the invitation and not change state. The inviter and other active members of the collaborative session will be in the "running" state 470, in which the conference manager keeps track of "active" members of the collaborative session (those, other than itself, who have accepted an invitation) and of "pending" members (those who have not yet responded to an invitation). When a station sends an invitation (at 472), it adds the invitees to the "pending" list, as depicted at 474. Similarly, when a "running" station sees that an invitation has been sent (at 476), it adds the recipient of the invitation to the "pending" list (at 478). Application modules other than conference manager 34a have access only to active members.

If a conference manager's response 432 to an invitation is to accept, its local state changes from "prompting" 430 to "accepted" 450. When the inviting station receives the acceptance (at 480), it responds with a "greeting" (the sending of which is indicated at 482; the receipt of which is indicated at 452), which causes the accepting station to transition to a "running" state 70. The "greeting" includes a list of stations in the "active" and "pending" states, to be tracked by the accepting station's conference manager. After sending the "greeting", the inviting station remains in a "running" state but it moves 484 the accepting station from the "pending" list to the "active" list. When a conference manager receives a "greeting", it will notify 454 the other active members of the collaborative session that it is now active. Those other active members, upon receiving the notice (depicted at 486) will then move 488 the accepting station from the "pending" list to the "active" list.

If a conference manager's response 432 is to reject an invitation, its local state changes from "prompting" to "dead" (unless it rejects the invitation because it had not been in a "dead" state, in which case its local state does not change). The active stations, upon receipt of a rejection 490, delete the invitee from the "pending" list. If there are now no other "active" members and no "pending" members (e.g., if all invitees reject an invitation), then the sole active station transitions to the "dead" state. Otherwise, the inviting station remains in a "running" state.

If a station leaves 496 a collaborative session, it transitions to the "dead" state and sends a message to the other members (the receipt of which by the active members is depicted at 494). The active members then delete 492 the departing station from the "active" list. If there are now no other "active" or "pending" members, the remaining member transitions to a "dead" state.

If the departing station had invited other stations that are still in a "prompting" or "accepted" state, then those stations transition to a "dead" state (as shown at 434 and 456).

Conference manager 34a also provides an interface accessible to the user of the computing device. Preferably, conference manager 34a includes a graphical user interface (GUI) that graphically depicts the state of the conference session via images in a window on monitor 26. Conference manager 34a can be implemented in software or in hardware attached to the workstation, with manual controls for changing the state. For example, a personal data assistant (e.g., Newton) could be used as a hardware conference manager. When any changes occur in the conference session, these are represented to the user via the interface for conference manager 34a.

Conference manager 34a also integrates any application module in a consistent manner through applications library 36. A graphical, iconic representation of each application module operating on a workstation 24 is presented within the conference manager window on monitor 26. When the user requests the use of an application module in a collaborative session (for example, by clicking a mouse on the icon), conference manager 34a sends a message to the appropriate application module. For GUI application modules, a window for the functions provided by that application module will be displayed on monitor 26, and the application module will be available for use.

Conference manager 34a also performs end user functions including maintaining lists of available users for conference sessions, automatically answering conference session requests, and automatically starting conference sessions.

Text tool application module 34b is used for capturing, transferring and displaying text among workstations. Text tool application module 34b allows a user to load, modify, save, and print basic ASCII text on the local system.

This is similar to any basic text editor available on computer systems, such as Microsoft's Notepad, Sun Microsystems' Text Editor, or the Free Software oundation's Emacs. Text tool 34b has the added capability of sending stored ext to one or more members of the conference. Text tool 34b provides a realtime method for sending messages to members in a conference session. Text messages sent by text tool 34b are displayed in the text tool window on the display of each recipient. Users can integrate this information with any other application module via a copy and paste operation through the clipboard of conference engine 40.

Graphics tool application module 34c is used for capturing, transferring, and displaying graphics files. Graphics tool application module 34c allows the user to view, save and capture graphics images from disk, the desktop, and external devices such as scanners. Once an image is loaded, the user has the option of panning and zooming, and saving the image in different formats, including Windows Bitmap (BMP), GIF, JPEG/JFIF, PCX, SGI, Sun Raster, TARGA, TIFF, and XWD. This is similar to a standard image viewer, such as Sun's Image tool for OpenWindows or XV (by John Bradley at the University of Pennsylvania), but with the added capability of sending an image to one or more members of the conference. When a user receives a message containing an image from the graphics tool 34c, the image is displayed in the graphics tool window on monitor 26. The receiving user can integrate this information with any other application module via a copy and paste operation through the clipboard of conference engine 40.

Chat tool application module 34d is used for providing a text screen accessible and visible to participating workstations. Chat tool 34d is a realtime interactive textual based conference tool. This tool allows users to post messages to a shared area of scrolling messages from conference members.

Unlike text tool 34b, chat tool 34d includes separate areas for outgoing and incoming messages. The users can elect to have their postings identified or anonymous. In addition, chat tool 34d integrates the clipboard functions of conference engine 40 so messages from other users via text tool 34b or any other application module can be integrated into this textual based conference.

The user may save or print any of the ongoing textual session via options provided through the chat tool GUI. For example, the user may enter a save screen or print screen command.

Whiteboard tool application module 34e is used for providing a whiteboard accessible and visible to participating workstations for displaying and editing images. Whiteboard tool 34e allows the user to exchange images loaded from disk, the desktop, or an external device such as a scanner, and to dynamically edit these images in a real-time manner with the other members of the conference session.

Whiteboard application module 34e exchanges messages for drawingbased operations and data packets containing image data. The drawing-based operations include operations to draw freehand lines, straight lines, circles, and rectangles, to fill areas with colors or shading patterns, to erase areas of the whiteboard, to change colors, and to change line width. These drawing capabilities, the implementation of which is well known in the art, are not available with graphics tool 34c.

As with graphics tool 34c, whiteboard tool 34e permits a user to pan and zoom, and to save loaded images in different formats, including Windows Bitmap (BMP), GIF, JPEG/JFIF, PCX, SGI, Sun Raster, TARGA, TIFF, and XWD. This is similar to a standard image editor, such as Sun's Icon Editor for Open Windows or Microsoft's Paintbrush, but whiteboard tool 34e has the capability of sharing the image with other conference participants and dynamically updating the image. At any time in the session, the user has the option of integrating the image data with other application modules via a copy and past operation through conference engine 40. Preferably, whiteboard tool 34e supports the use of multiple pages so different subject matter can be discussed on different pages.

Audio tool application module 34f is used for capturing, transferring, and displaying audio among workstations. Audio tool 34f interfaces to conference engine 40 and the audio hardware subsystems 54a of workstation 24 (such as Sun's SPARCstation audio, Digital Equipment Corporation's J300, Hewlett-Packard's HP-UX audio, and IBM's Ultimedia Services) to distribute digital audio data in real-time to the members of the conference session. This provides audio conferencing to the members of a conference session in a manner similar to that accomplished over telephone lines with analog signals.

In addition to the real-time distribution of digital audio data, audio tool 34f allows the user to control attributes of the audio session. The user can control from whom data will be received and to whom it will be sent. Preferably, graphical depictions of the audio signals are provided via a GUI interface displayed on monitor 26.

Video tool application module 34g is used for capturing, transferring, and displaying video signals among workstations and providing audio/video synchronization. Video tool 34g interfaces to conference engine 40 and the digital video hardware subsystems 54b (such as Sun's Sun Video, Parallax's XVideo and PowerVideo, DEC's J300 and JV3, and IBM's Ultimedia Services) of workstation 24 to distribute compressed digital video data in real-time to the members of the conference session. This provides video conferencing to the members of a conference session in a real-time manner, similar to that accomplished over ISDN lines with non-packed oriented video conferencing systems, such as PictureTel's PCS-100 and Intel's ProShare.

In a preferred embodiment, video tool 34g includes compression/decompression (CODEC) technology accomplished in software. Video is captured in digital format from hardware subsystem 54b on workstation 24 and if it is not already compressed, the user can select among supported compression algorithms supported in software. Preferably, video tool 34g supports Cell B, H.261, INDEO, Motion JPEG, and InSoft's DVE.

In addition to the real-time distribution of digital video data, the video tool allows the user to control attributes of the video session, including from whom video feed will be received and to whom it will be sent.

As can be seen from the foregoing, text tool 34b, graphics tool 34c, chat tool 34d, whiteboard 34e, audio tool 34f, and video tool 34g are implemented with mechanisms well known in the art.

Some application modules are more specialized. For example, an application module is used to drive the position of a video camera on the desk of a conference participant. This application module provides visual representations of the positions of both the local and remote cameras, and permits the local user to change either of those positions. Video tool application module 34g responds to changes in the camera positions by changing the displays.

Application modules 34 can include both hardware and software. For example, in a preferred embodiment graphics tool 34c includes a graphics board and a scanner, a fax machine, or other digital capturing devices.

A particular embodiment of the collaborative computing system of the present invention need not include all of these application modules, and could have others. One of the advantages of the invention is that it permits flexibility in initially structuring a conferencing system and then upgrading the system as users' needs change and as new or improved functions become available. The included application modules will depend on the users' requirements.

Application modules 34 are linked to applications library 36, which supplies standardized functions needed for the application modules to communicate with conference engine 40. In a preferred embodiment, applications library 36 includes session management functions, event handling functions, message functions, member information functions, application module locating functions, conference management functions, user locating functions, memory management functions, clipboard functions, and application-defined data functions.

Preferably, the session management functions include an open session function, to open a connection between the application module and the conference engine; a close session function, to close a connection between the application module and the conference engine, and to free associated memory; a detach session function, to close a connection between the application module and the conference engine when related application modules are still running; a get port function, to get a port number for the application module for the collaborating computing session; register and unregister functions for use with third-party toolkits; a loop function, to obtain a response when another application module ends its session; functions to monitor inputs other than those used by the collaborative session; a synchronize function, to determine whether the conference engine has acted on all previous requests sent by the application module; a mapped function, to determine whether the application module should be hidden from the user; a ready function to inform the conference manager that the application module is initialized and ready to operate; and looping functions.

Preferably, the event handling functions include a set event function, for setting the function that should be called when a specified event occurs; a get event function to determine the function called when events of a specified type occur; and add and delete event functions, for setting an additional function or deleting a function that should be called when a specified event occurs.

Preferably the message functions include a set message function, for setting the function that should be called when a particular message from another application module arrives; a get message function, to determine the function called when messages of a specified type arrive; add and delete message functions, for setting an additional function or deleting a function that should be called when a particular message arrives; an initialize data packet function to initialize a data packet to be sent to another application module; functions to allocate or free a data packet of a given size; functions to add and delete specific members from a list of participants in a session, or to determine if a specific member is in a list of participants; and a function to distribute a data packet to listed members of a collaborative session.

Preferably, the member information functions include functions to identify a user of a conference engine or the participants in a collaborative session; a function to determine whether a participant is "active"; and a function to identify all active participants.

Preferably, the application module locating functions include a function to determine whether a particular application module is present with a specified user; a scan function to identify all users for whom a particular application module is present; a broadcast function to signal other application modules and, upon receiving a reply, carrying out specified functions; and functions to set the function to invoke when particular data packets arrive.

Preferably, the conference management functions include an initiate conference function, to send an invitation to specified users to initiate a collaborative session; an add member function, to send an invitation to a user to add to an active session; a leaving function, to permit a local user to leave an active session; functions to set the functions invoked when invitations arrive; functions to accept or reject an invitation, and functions to provide for automatic rejection of invitations.

Preferably, the user locating functions include a function to open a network socket to use the other locator functions; a function to close the network socket when finished using locator functions; functions to determine the fields of a user locator and respond to activity in those fields; a set pointer function to associate a pointer to application-defined data with a given locator; a get pointer function to retrieve a pointer set with the set pointer function; a polling function to poll for other conference engines running on a network and set the function that will be invoked when a reply is received; a close poll function, to close down a poll that has been sent; a set poll pointer function to associate a pointer to application-defined data with a given poll; and a get poll pointer function to retrieve a pointer set with the set poll pointer function.

Preferably, the memory management functions include functions to allocate and free blocks of memory.

Preferably, the clipboard permits data to be placed onto the clipboard in different formats (e.g., text might be placed as both text and as an image of the text) at the same time. Preferably, the clipboard functions include an open function, to open a clipboard of a specified user; a close function to close a specified clipboard; a lock function to lock the clipboard for use only by the application module that uses the lock function; an unlock function to unlock a clipboard so it can be used by other application modules; a wipe function, to wipe (erase) the contents of a clipboard; a put function, to put a given data item of a specified format onto a clipboard, overwriting an item in the same format; a get function, to get the data item of a specified format from a clipboard; a check format function, to determine whether data of a specified format is present on a clipboard; a set monitor function, to set a function to be invoked when the contents of the clipboard change; an end monitor function, to cancel the set monitor function; a set format monitor function, to set a function to be invoked when an item of a specified format is added or erased; an end format monitor function, to cancel the set format monitor function; an owner function, to determine which user opened the clipboard; and a blocked function, to determine if the clipboard is blocked, awaiting completion of an earlier lock or get function.

Preferably, the application-defined data functions include a set function to associate a pointer to user-defined data with a particular collaborative session (to distinguish, for example, data used in different sessions when an application module may have multiple simultaneous active sessions); a get function to retrieve data associated with the session; a set tag function to associate user-defined data with a specified tag; and a get tagged function to retrieve data under a specified tag associated with the session.

Application modules 34 connect to conference engine 40 through IPCs 38. IPCs 38 are operating system dependant. For example, in a UNIX environment IPCs 38 are UNIX domain sockets and in a Microsoft Windows environment IPCs 38 are DLLs.

An application module 34 can interact with other application modules in workstation 24 to form a collaborative application. For example, a conference manager and audio and video tools are used to provide basic desktop conferencing. Application modules 34 interact with their counterparts in other workstations, through conference engine 40 and network 50, to provide their specific services. Preferably, application modules 34 also can communicate directly with the network when sending large quantities of data or when performing certain conference management functions (such as adding a new user to a collaborative session).

User interface modules 30 permit customized user interfaces for application modules 34, in conjunction with user interface API 32. User interface API 32 allows developers to access all of the technology of the application modules while having the flexibility to modify the interfaces to these components. An example of this is a whiteboard that needs to have less functionality then a currently available whiteboard application module. The core of the tool, such as sharing images and basic markups, could be utilized, but the paging features may be disabled. With user interface API 32, necessary functionality could be preserved and other features could be disabled. This permits the customization of a conferencing system for a specific user's needs. User interface API 32 allows the integration of the core technology of an application module while changing the end user GUI by creating a specialized user interface module 30.

User interface API 32 also provides the functions needed for user interface modules 30 to communicate with application modules 34, so that user interface modules 30 can be application module independent. That is, user interface API 32 permits the creation of custom user interfaces that will not change if the underlying application module 34 changes.

Once a conference engine 40 is started on a workstation 24, a distributed conference session may be started. This session can be started from any single conference engine and any number of additional conference engines may be added. When a session is started by any one conference engine, all involved conference engines are updated with a state change and all involved conference engines form a tightly coupled network for the new conference session. A state change event may generate local events in any application module 34 running on a workstation 24. If the application module 34 makes it known to conference engine 40 that it wants to be informed of certain state changes, the conference engine 40 will provide the requested notification. After the initial start-up of the session is completed, conference engine 40 will provide the services requested of it by the local application modules 34, as well as deliver any messages and data from other conference engines 40 in the session to the appropriate application module 34.

Figure 2:
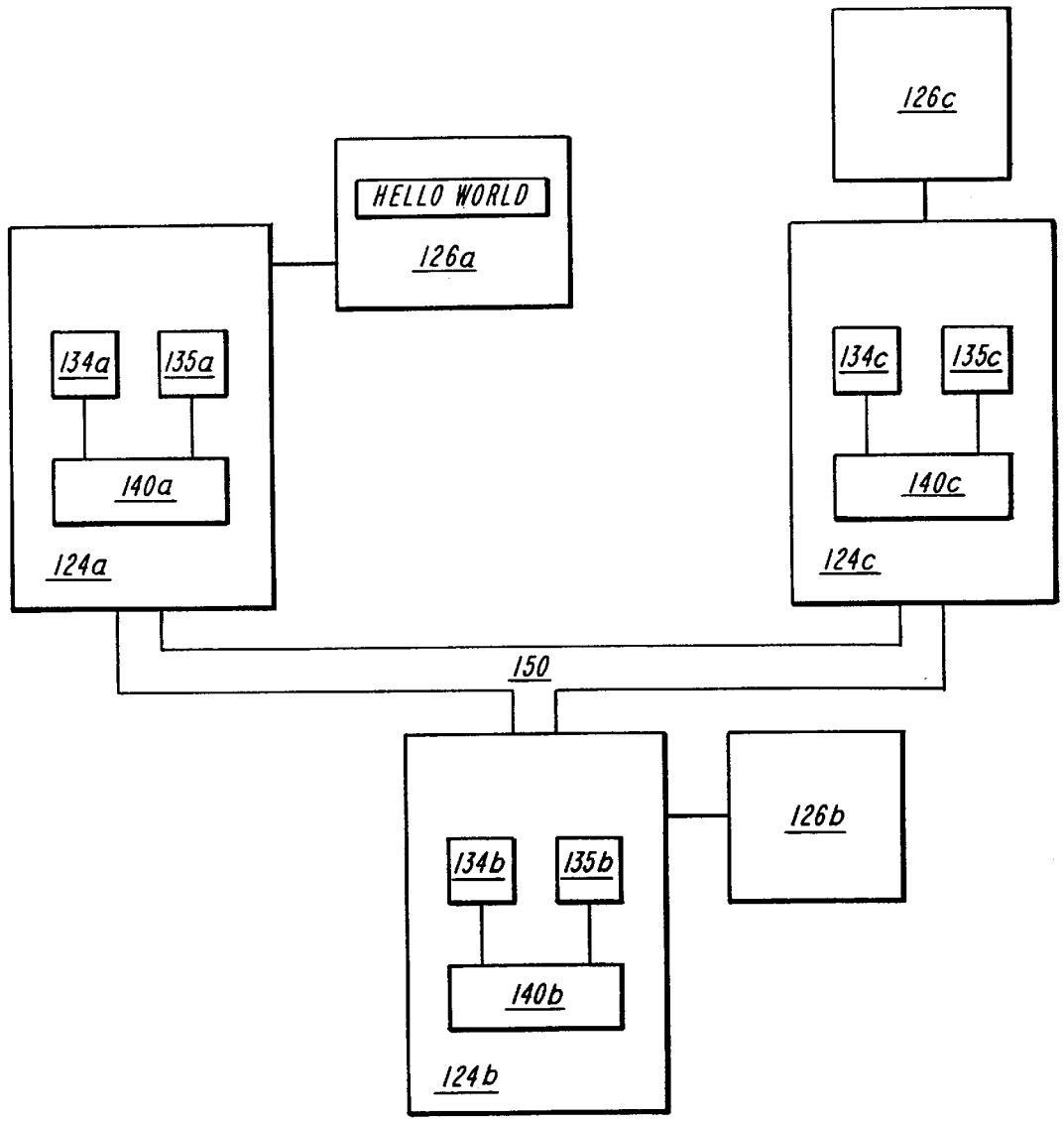
FIG. 2 is a block diagram of a second embodiment of a collaborative computing system of the present invention.

For example, in FIG. 2, three workstations 124*a*, 124*b*, and 124*c* are on network 150. A conference engine 140 (shown as 140*a*, 140*b*, and 140*c*) runs on each workstation. While three workstations, each running a single conference engine, are illustrated in this example, it is understood that any number of workstations, some or all running more than one conference engine, could be utilized. Where multiple conference engines run on a single workstation, multiple collaborative sessions can be conducted simultaneously from a single workstation. Each conference engine 140 connects to a conference manager application module 134 (shown as 134*a*, 134*b*, and 134*c*) and a text tool application module 135 (shown as 135*a*, 135*b*, and 135*c*). Text tool application module 135 provides text messaging capabilities. To begin a conference session, conference engine 140*a* receives a 5 request from its local conference manager 134*a* to begin a conference with workstations 124*b* and 124*c*. The conference request is delivered to the remote conference engines 140*b* and 140*c*, through network 150. Conference engine 140, in turn, delivers the request to the appropriate application module—conference manager 134. Through its graphical user interface, conference managers 134*b* and 134*c* ask the users of those workstations if they wish to join the collaborative session. 'The users' answers are passed through their local conference managers 134*b* and 134*c* to local conference engines 140*b* and 140*c*, respectively. Responding conference engines 140*b* and 140*c* delivers the responses back to requesting conference engine 140*a*. The requesting conference engine 140*a* delivers the responses to the requesting conference manager 134*a* and the distributed state machine is updated at each conference engine 140 to reflect the initiation of the collaborative session. Alternatively, conference managers 134 on workstations 124*b* and 124*c* could be set to accept or reject a conference request automatically.

After the collaborative session is established, each conference engine 140 will maintain the conference state and deliver any messages requested by the connected application modules 134 and 135. For example, a user of workstation 124*a* could type a message in the graphical user interface for text tool 135*a* (the message "Hello World" depicted on display 126*a*). Text tool 25 135*a* delivers this message to its conference engine 140*a*, which creates a data packet to send over network 150 to conference engines 140*b* and 140*c*. The port number for text tool 135 ensures that the message is relayed to text tools 135b and 135c, rather than some other application module, which may not be able to process the information received. Text tools 135b and 135c display the message in the graphical user interface on displays 126b and 126c.

At any time during this session, a member could elect to change the state of the conference by electing to leave the session, or to add one or more other members to the session. If members are added to the session, all the conference engines 140 in the session are informed and form a new conference state that is shared by all conference engines across the network. Consequently, if an application module (e.g., text tool 135) distributes data packets to the members of the session, all of the conference engines and the corresponding application modules receive this data.

Likewise, if a member leaves the session, all of the conference engines are updated of this state change. Preferably, in response to any state change event, the conference manager 134 will graphically depict this state change to the user.

Figure 3:
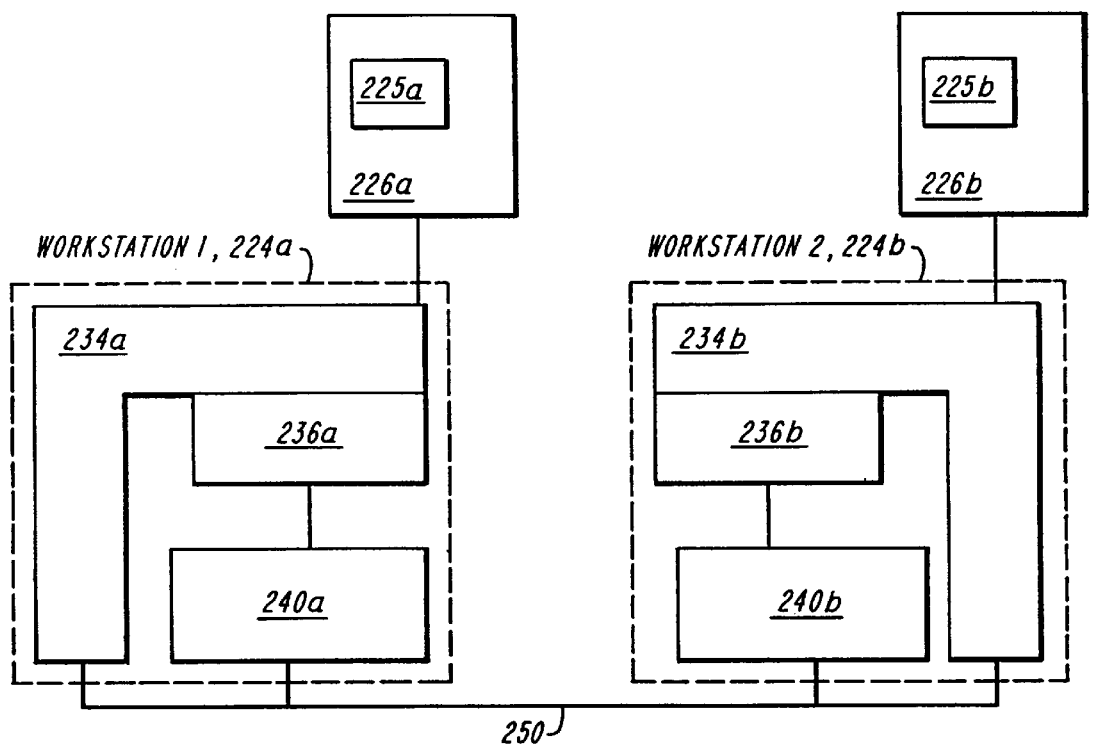
FIG. 3 is a block diagram of the data flow to and from an application module in the collaborative computing system of the present invention.

In operation, a user at a first workstation 224a (FIG. 3) would, for example, display a new image on his or her whiteboard 225a, which is a window displayed on monitor 226a. Whiteboard 225a is controlled by whiteboard application module 234a, which displays the new image for the user. Whiteboard application module 234a also issues instructions, using applications library 236a, to its local conference engine 240a to send the new image to the other collaborative participants. Local conference engine 240a sends the necessary events to remote conference engine 240b of the other participant over network 250. It is understood that, although only one other workstation 224b is illustrated, multiple remote workstations could participate. Whiteboard application module 234a then sends the image data directly over network 250. Remote conference engine 240b first receives the event information and sends the necessary commands to its whiteboard application module 234b, to prepare to receive a new image. Whiteboard application module 234b then receives the new image and displays it on whiteboard 225b on monitor 226b.

Figure 4:
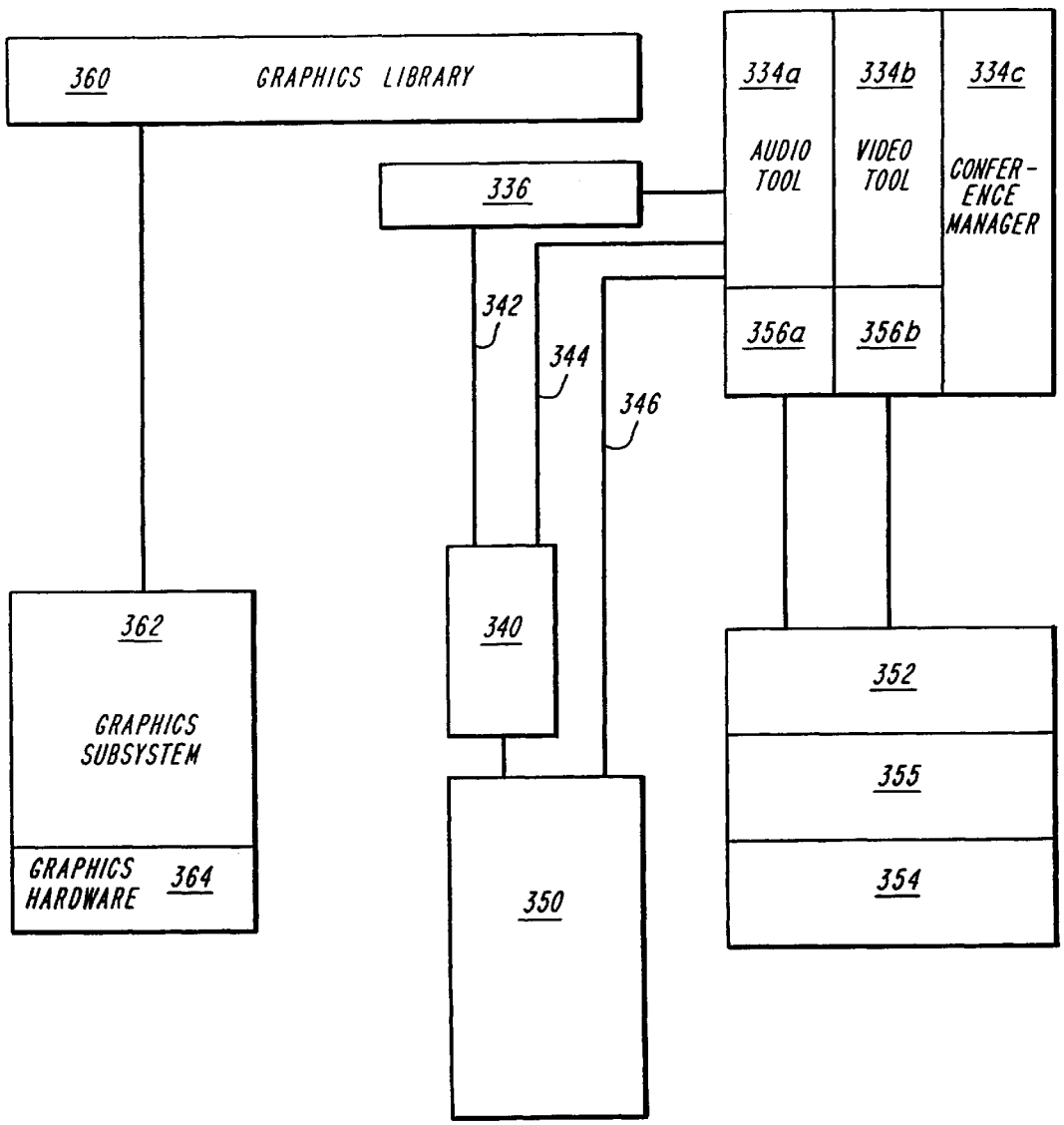
FIG. 4 is a block diagram of the structure of a third embodiment of the collaborative computing system of the present invention.

The structure of a collaborative computing application is illustrated in FIG. 4. Collaborative computing application 358 includes audio tool application module 334a, video tool application module 334b, and conference manager application module 334c. Audio tool 334a and video tool 334b include audio and video capture/display drivers 356a and 356b, which connect to compression/decompression software 352, and to audio/video hardware 354 (e.g., a monitor, a video camera, a microphone, and a speaker), through multimedia subsystem 355. Multimedia subsystem 355 includes the audio and video subsystem components described above. Alternatively, compression and decompression could be accomplished with hardware, such as with Parallax's XVideo or PowerVideo, or Sun's Sun Video.

Collaborative computing application 358 communicates with conference engine 340 using applications library 336 (as shown by line 342), and also directly (as shown by line 344).

Direct connections between collaborative computing application 358 and conference engine 340, and between collaborative computing application 358 and network 350, allow high volume data to be distributed directly from application module to application module, with less overhead, while still allowing the user of the API to be sheltered from the low level details of network programming. Although data is sent directly over network 350, negotiation of, for example, network addressing or port numbering is handled by communications between the conference engines. This simplifies a relatively complex task for an application module that seeks to send data directly, and allows the application module to be written without a detailed knowledge of network protocols and procedures. Conference engine 340 will generate an event to permit an application module to receive a data transmission directly.

Collaborative computing application 358 also is connected to graphics library 360, which provides the graphics functions necessary to manipulate images on the display. Graphics library 360 (such as Xlib in a Unix workstation environment) connects to the graphics subsystem 362 (such as the XWindow System Server in a Unix workstation environment), which processes graphics commands using graphics hardware 364.

Conference engine 340 sends events and data over network 350, as instructed by collaborative computing application 358. Conference engine 340 also receives events and data from network 350, which are passed to collaborative computing application 358. Collaborative computing application 358 also has a direct connection to network 350, via line 346, for sending data.

While there have been shown and described examples of the present invention, it will be readily apparent to those skilled in the art that various changes and modifications may be made therein without departing from the scope of the invention as defined by the appended claims. Accordingly, the invention is limited only by the following claims and equivalents thereto.

What is claimed is:

1. A collaborative computing system for a computer network comprising:
   an application module at a workstation for providing a network independent computing function;
   a conference engine at the workstation for processing data and event task requests from the application module, distributing data and events over the network, receiving data and events from the network, providing data and event information to the application module, and maintaining a collaborative computing state, wherein the conference engine is coupled to the application module;
   means for connecting the conference engine to the network;
   wherein the conference engine coordinates and negotiates with other conference engines to form a distributed conference session;
   wherein each conference engine within said session tracks the status of every participant in said session;
   wherein each conference engine maintains a distributed state machine that is dynamically updated to reflect the current state of every distributed conference session that the conference engine is monitoring; and
   wherein a centralized server is not needed to create a conference session.

2. The collaborative computing system of claim 1, further comprising a user interface module for providing a custom user interface for the application module.

3. The collaborative computing system of claim 1, further comprising a user interface module for providing a user interface for the application module wherein the user interface is independent of the application module.

4. The collaborative computing system if claim 1, further comprising:
   a conference manger at the workstation for setting the collaborative computing state.

5. The collaborative computing system of claim 4, wherein the conference manager maintains a list of users for collaborative computing sessions.

6. The collaborative computing system of claim 1, further comprising an application library linked to the application module for providing network and collaborative computing functions to the application module.

7. The collaborative computing system of claim 6, wherein the application library includes functions to connect the application module to the conference engine, to create and respond to events, to determine the status of the application module, to allocate and manage memory, to create a data packet for transmission over the network, and to transmit the data packet over the network.

8. The collaborative computing system of claim 1, further comprising means for connecting the application module to the network.

9. The collaborative computing system of claim 1, wherein the application module is a text tool, a graphics tool, an audio tool, a video tool, or a whiteboard tool.

10. The collaborative computing system of claim 1, wherein the conference engine includes a clipboard for use by the application module.

11. The collaborative computing system of claim 10, wherein the application library further includes at least one function to use the conference engine clipboard.

12. A collaborative computing system for a computer network comprising:

a plurality of application modules at a workstation, each for providing a network independent collaborative computing function;

a graphics subsystem at the workstation coupled to at least one of the application modules;

a compression/decompression subsystem at the workstation coupled to at least one of the application modules;

a multimedia subsystem at the workstation coupled to at least one of the application modules, a conference engine at the workstation for processing data and event task requests from at least one of the plurality of application modules, distributing data and events over the network, receiving data and events from the network, providing data and event information to at least one of the plurality of application modules, and maintaining a collaborative computing state, wherein the conference engine is coupled to the plurality of application modules;

means for connecting the conference engine to the network;

wherein the conference engine coordinates and negotiates with other conference engines to form a distributed conference session;

wherein each conference engine within said session tracks the status of every participant in said session;

wherein each conference engine maintains a distributed state machine that is dynamically updated to reflect the current state of every distributed conference session that the conference engine is monitoring; and wherein a centralized server is not needed to create a conference session.

13. The collaborative computing system of claim 12, wherein at least one of the plurality of application modules supports windowing system clipboard operations.

14. The collaborative computing system of claim 12, wherein one of the plurality of application modules is a conference manager for controlling and displaying a collaborative computing state.

15. The collaborative computing system of claim 14, wherein the conference manager initiates requests over the network and responds to requests received from the network to initiate a collaborative computing session.

16. A collaborative computing system for a computer network comprising:

an application module at a workstation for providing a network independent computing function;

a conference engine at the workstation including a collaborative computing states machine, wherein the conference engine is coupled to the application module;

means for connecting the conference engine to the network;

wherein the conference engine coordinates and negotiates with other conference engines to form a distributed conference session;

wherein each conference engine within said session tracks the status of every participant in said session;

wherein each conference engine maintains a distributed state machine that is dynamically updated to reflect the current state of every distributed conference session that the conference engine is monitoring; and wherein a centralized server is not needed to create a conference session.

\* \* \* \* \*